Figure 1:
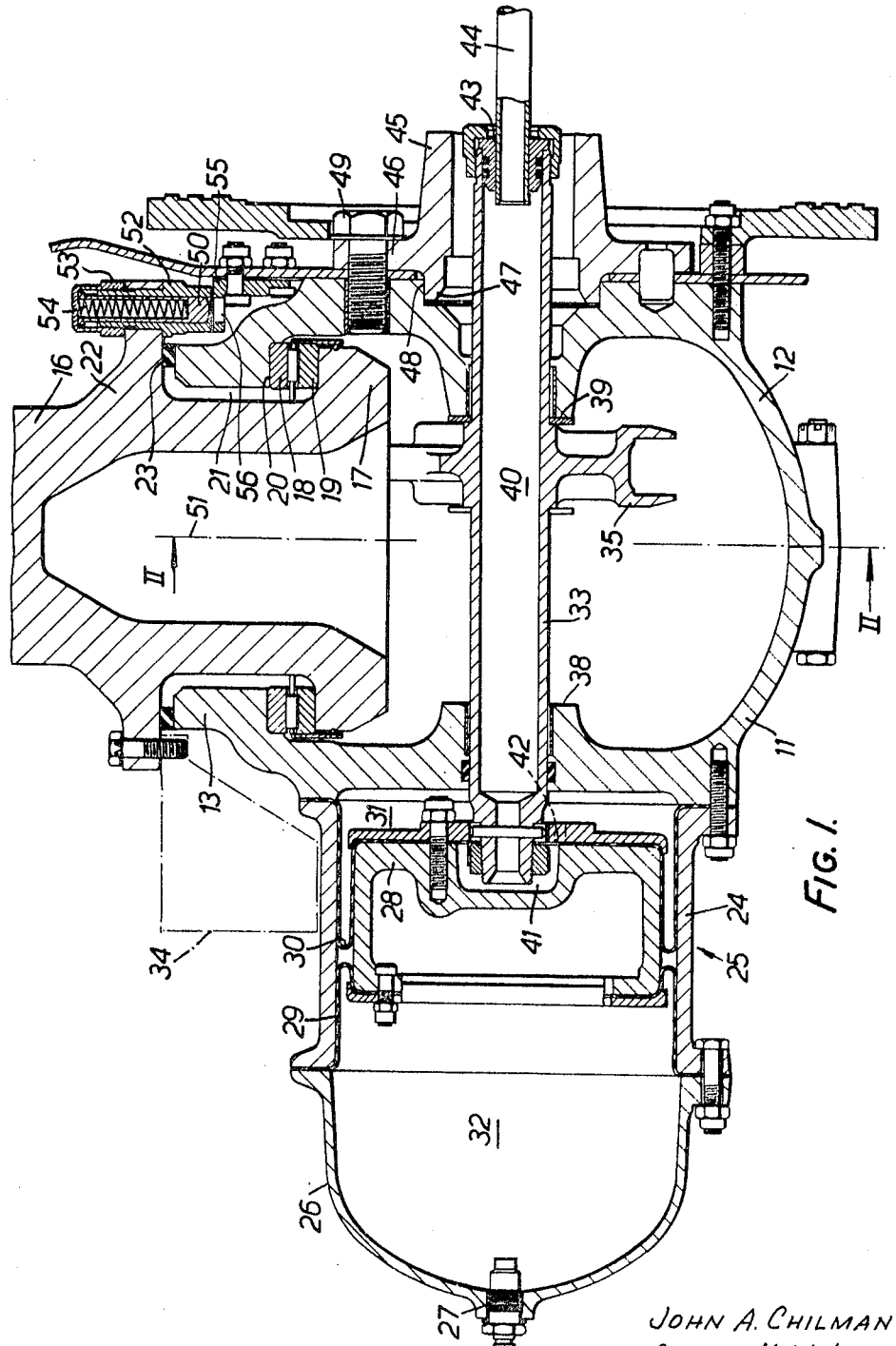

United States Patent
Chilman et al.

[15] 3,637,323
[45] Jan. 25, 1972

[54] VARIABLE-PITCH BLADED ROTORS

[72] Inventors: John Alfred Chilman, Painswick; Alfred Herbert Walter Loynes, Tewkesbury; Peter Spence, Cheltenham, all of England

[73] Assignee: Dowty Rotol Limited, Gloucester, England

[22] Filed: June 18, 1969

[21] Appl. No.: 834,297

[30] Foreign Application Priority Data

July 8, 1968 Great Britain......................32,404/68

[52] U.S. Cl.................................416/139, 416/46, 416/153, 416/157
[51] Int. Cl.............................................B64c 11/40
[58] Field of Search.....................416/46, 48, 139, 140, 153, 416/154, 155, 157, 160, 44, 51, 144, 45; 92/98 RD

[56] References Cited

UNITED STATES PATENTS

| | | |
|---|---|---|
| Re. 25,096 | 12/1961 | Biermann............................416/154 X |
| 2,702,023 | 2/1955 | Seeloff..........................92/98 RD UX |
| 2,722,985 | 11/1955 | Biermann.............................416/46 |
| 3,115,937 | 12/1963 | Biermann.............................416/46 |
| 2,815,590 | 12/1957 | Fiacco..............................416/153 X |

Primary Examiner—Everette A. Powell, Jr.
Attorney—Young & Thompson

[57] ABSTRACT

A variable-pitch bladed rotor having a pitch-change motor which includes a casing and a diaphragm device which together define on one side of the device a closed chamber for fluid under pressure, and on the other side of the device an actuator chamber. Means are provided for varying the pressure of fluid in the actuator chamber, and means are connected to the diaphragm device for transferring movement thereof, consequent upon such variation in pressure, to the blades to vary their pitch.

3 Claims, 5 Drawing Figures

JOHN A. CHILMAN
ALFRED H. W. LOYNES
PETER SPENCE
INVENTORS

BY Young + Thompson
ATTORNEYS

JOHN A. CHILMAN
ALFRED H. W. LOYNES
PETER SPENCE
INVENTORS

BY Young & Thompson
ATTORNEYS

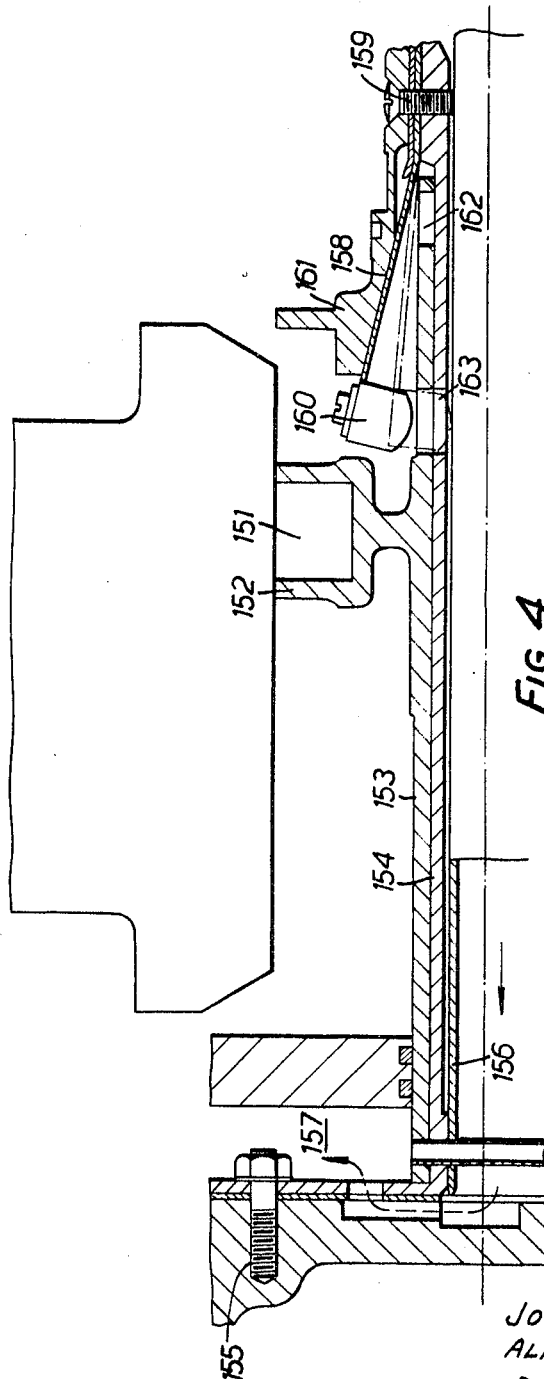

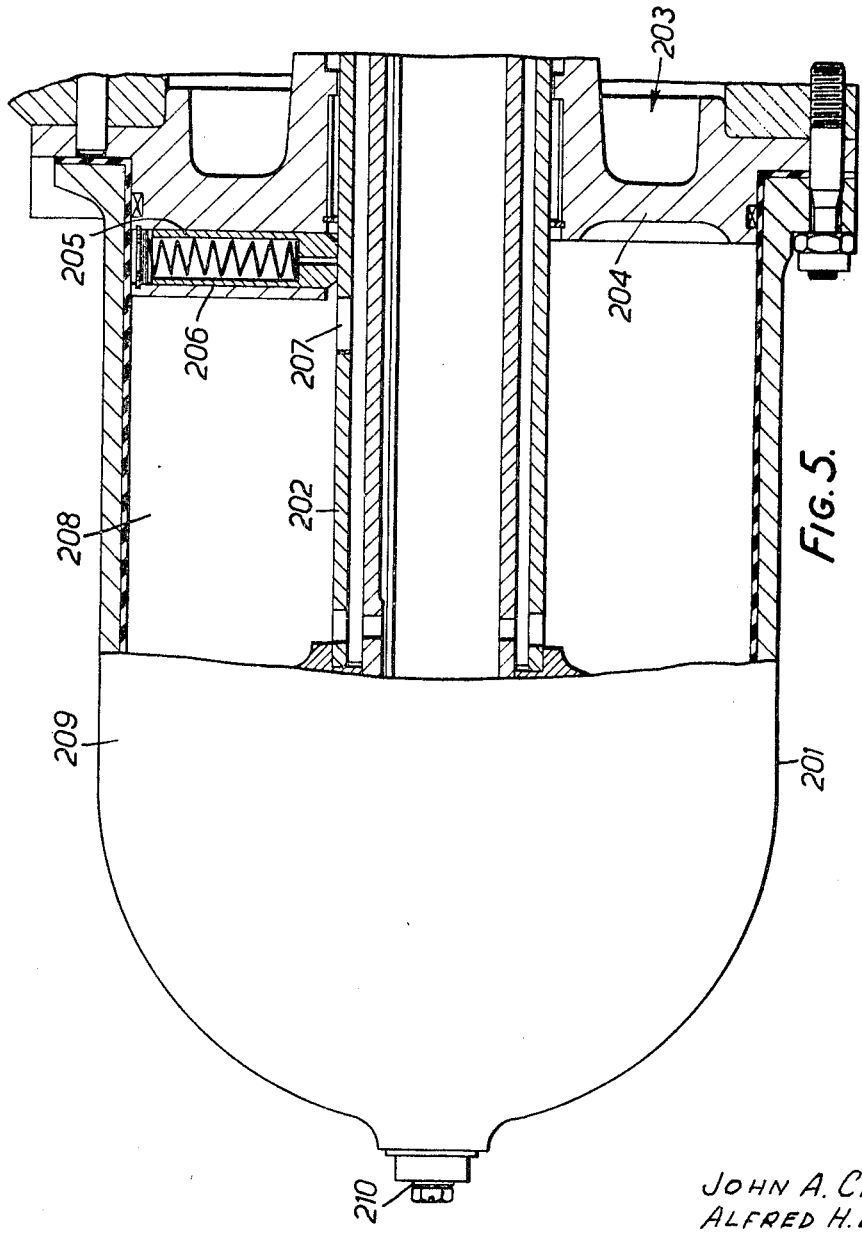

VARIABLE-PITCH BLADED ROTORS

This invention relates to variable-pitch bladed rotors.

According to this invention a variable-pitch bladed rotor includes a pitch-change motor having a casing and a diaphragm device which together define, on one side of the diaphragm device, a closed chamber for containing a fluid under pressure, and on the other side of the diaphragm device, an actuator chamber, means for varying the pressure of fluid in the actuator chamber, and means connected to the diaphragm device for transferring movement thereof, consequent upon such variation in pressure, to the blades to vary their pitch.

The diaphragm device may comprise two diaphragms, spaced apart the one from the other, connected at their outer edges to the casing and connected at their central portions to a rigid member. The size and nature of the two diaphragms are such that during their movement with the rigid member, each undergoes a rolling action or an unrolling action according to its direction of movement.

The means for transferring movement of the diaphragm device may comprise a linkage which mechanically connects said rigid member to the blades.

The linkage may comprise a rigid hollow tube extending coaxially of the rotor and carrying or having formed therewith a yoke member by which the rigid hollow tube is coupled to crankpins carried by the blades.

The rigid hollow tube may be open to the actuator chamber and fluid under pressure be conveyed to that chamber through the rigid hollow tube. The flow of fluid to the actuator chamber may be under the control of manually adjustable valve means arranged coaxially with respect to the tube, the tube in moving with the diaphragm device affording followup under the manually initiated pitch-change motor control.

The rotor may be a propeller. In this case the blades thereof may be provided with flyweights which are so positioned as in operation of the propeller to afford bias of the blades in the pitch-coarsening direction, the fluid in the closed chamber preferably also urging the diaphragm device and the blades in the pitch-coarsening direction.

Where the displacement of the pitch-change motor for blade pitch-change is required only to be of relatively small order, the diaphragm device may comprise a rigid member surrounded by a ring of flexible material, for example, rubber bonded thereto, and also bonded to the inner surface of the casing.

At least one blade may carry a plunger at its root portion which is engageable with an indent, stop or the like, in the structure of the hub set in a position corresponding to a predetermined blade angle. Engagement of the plunger with said indent, stop or the like is intended to occur with reduction of centrifugal force thereupon when the rotor slows down below a predetermined rotational speed, thereby to hold the blades at said predetermined blade angle.

Preferably, the predetermined blade angle referred to above is of low (fine) order to afford low drag during starting of the engine driving the propeller.

The above plunger and latch arrangements ensure that stopping of the propeller occurs with the blades in the predetermined pitch position in readiness for the next engine/propeller startup.

Also, according to the invention, there is provided a variable pitch bladed rotor having blade pitch varying means, wherein a blade is provided with a plunger at its root portion which is engageable with an indent, stop or the like positioned within the hub of the rotor, set at a position corresponding to a predetermined blade angle at which the blades of the rotor are required automatically to be locked or held as the rotor slows down towards the stopped condition, said plunger being caused by centrifugal force, upon increase in rotational speed, to be released from engagement with said indent, stop or the like when the rotor exceeds a predetermined rotational speed.

An embodiment of the invention will now be particularly described by way of example with reference to the accompanying drawings, of which, FIG. 1 is a cross section of an hydraulically operable variable-pitch aircraft propeller, and 2 is a cross section take along the line II—II on FIG. 1.

Figure 2:
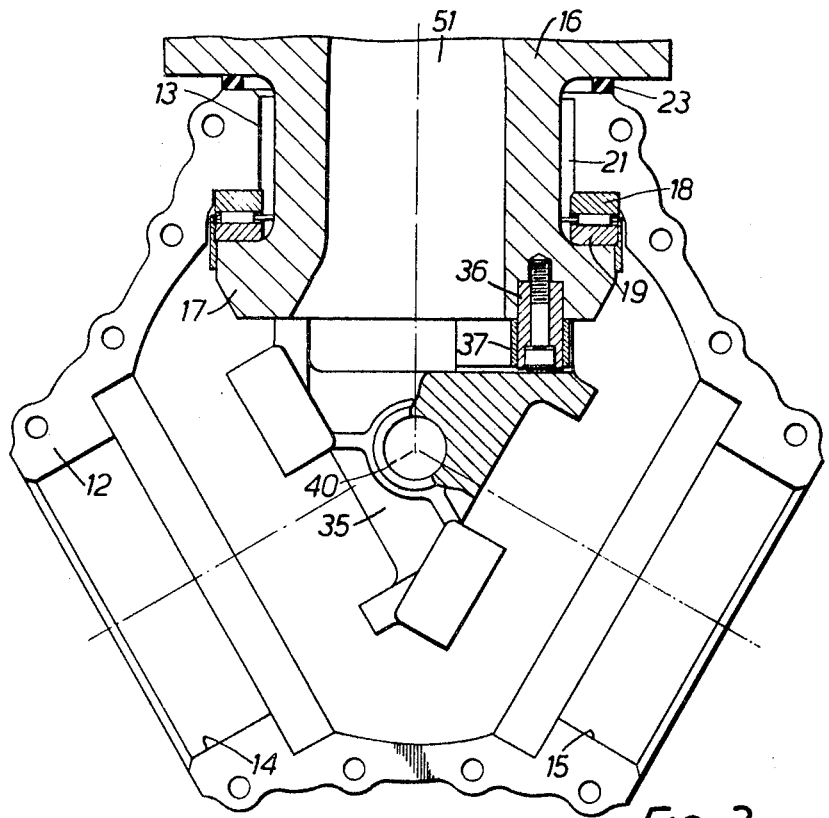
Figure 3:
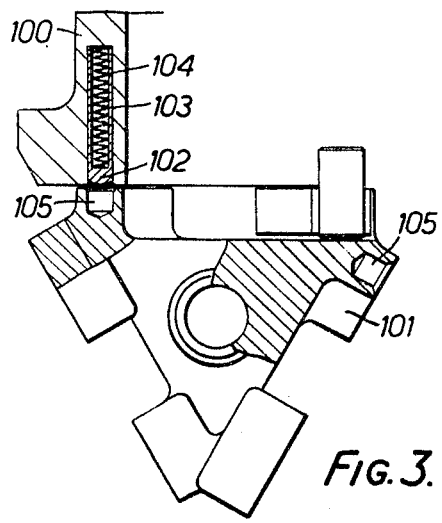

Referring to FIGS. 1 and 2 of the drawings, and hydraulically operable variable-pitch aircraft propeller includes a hub structure which comprises a bolted-up two-part casing 11, 12 and so shaped as to afford three sockets 13, 14 and 15, each of which receives a propeller blade, as at 16. The extreme root portion of each blade is provided with a flange 17, and a bearing assembly 18, of roller type with a split inner race 19, is interposed between this flange and a flange portion 20 of the respective socket. A split plain journal bearing 21 is provided around the root portion. Just externally of the socket the blade is provided with a further flange 22 and a sealing ring 23 is interposed between this flange and the outermost face of the respective socket.

Bolted to the forward face (the left-hand face in FIG. 1) of the hub casing 11/12 is the cylinder 24 of a pitch-change motor 25 having a dome-shaped closure member 26 bolted thereto. This member is provided with an inflation valve 27.

The cylinder 24 houses a rigid member 28 to which two diaphragms 29 and 30 are attached in the manner shown. The outer peripheries of the two diaphragms are secured to the casing at spaced positions therealong, as shown in FIG. 1. These diaphragms which are of rubber/fabric material have a rolling action upon linear displacement of the member 28.

Thus a chamber 31, which is an actuator chamber, is formed to the right of the member 28 in FIG. 1, while a closed chamber 32 for fluid under pressure is formed to the left thereof.

The chamber 31 is suppliable with hydraulic liquid under pressure through a tube 33 which is attached to the member 28 at its left-hand end portion in the drawing, while the chamber 32 is chargeable with nitrogen under a pressure of 100 p.s.i. through the inflation valve 27.

Bolted to each of the blades externally of their sockets is a respective flyweight as at 34 in FIG. 1, and in operation the flyweights, in known manner, bias the blades in the pitch-coarsening direction, as does the gas spring afforded by the nitrogen in the chamber 32. When applied to the chamber 31, hydraulic liquid under pressure opposes the sum of the efforts of the gas spring and flyweights to urge the blades towards fine pitch.

In order to drive the blades for pitch-change, the tube 33 acts as a diaphragm movement-transferring means and is formed with a yoke member 35 which connects to each respective crankpin 36 through a crosshead assembly 37.

Stops 38 and 39 are formed on the casing parts 11 and 12 and are engageable with the yoke member 35 to limit the range of pitch-change adjustment of the blades between a reverse pitch position (negative angle) and the fully feathered position.

The interior 40 of the tube 33 is in communication with the interior of the chamber 31 through a cavity 41 in the rigid member 28 and through porting as at 42.

The tube 33 is connected, as at the union assembly 43, to a tube 44 of smaller diameter which extends back from the propeller hub (to the right in FIG. 1), and although not shown in the drawing, at its other end portion this forms one part of a spool and sleeve-type valve assembly, the other part of which is operable manually to either admit pressure liquid to the tube 44 or to permit exhaust of liquid therefrom, such that the member 28 either moves to the left or to the right in FIG. 1, movement of the tubes 33/44 with the member, to which they are connected, affording followup in the valve assembly which effects arrest of movement of the member as soon as the manually selected movement is completed.

The gas turbine engine (not shown), which drives the propeller, has an output shaft 45 which bears a flange 46 and a spigot 47, the latter engaging a socket 48 in the casing part 12, while the former is bolted to the casing by means of eight set bolts, one of which is shown at 49 in FIG. 1.

The flange 22 of each blade is provided with a speed-sensitive plunger 50 whose axis is parallel to the blade rotational axis 51. This plunger is mounted in two-part housing 52/53 and is biased radially inwardly by a coil spring 54.

A plate 55, having an indent in the form of a drilled hole 46, is bolted to the casing part 12 of the hub, and when the blade reaches a low pitch position, in this case 0°, then provided the rotational speed of the propeller is below 600 r.p.m., the spring 54 urges the plunger 50 into engagement with the hole 56 to lock the blade at this pitch angle.

In operation of the aircraft propeller, it is desirable that the blades thereof should be held at ° for starting of the engine so that a minimum aerodynamic load is placed on the engine during the starting cycle. This is achieved, as already explained, by the provision of the plunger 50 and indent 56.

Upon starting of the engine, hydraulic pressure for operation thereof is generated by a suitable pump driven by the engine, and thus liquid under pressure is immediately available at the spool and sleeve-type valve assembly (not shown) associated with the tube 44.

The pressure in the gas chamber 32 is applied against the member 28 and the diaphragm 29 in the coarse pitch direction, but this of course is locked in a pitch corresponding to 0°. As the engine commences to increase in speed, the gas force is supplemented by the effect of the flyweights 34. However, before reaching 600 r.p.m. it is necessary for the pilot to introduce liquid under pressure into the chamber 31, otherwise as soon as 600 r.p.m. is reached, the plunger 50 might fly out of its indent under centrifugal force and the blades would be urged straight to full coarse pitch.

Thus admission of pressure liquid into the chamber 31 is such as to oppose the effort of the gas volume and flyweights, and initially this pressure is sufficiently high to allow the plunger 54 easily to move out of the indent 56 as soon as the propeller speed reaches 600 r.p.m. Such opposition is however relaxed slightly following release of the plunger to an extent such that the blades move in the coarse pitch direction as far only as 15°. The blades are then maintained at this position, being held there as the engine is opened up to takeoff r.p.m.

This pitch condition is also maintained for the takeoff run and the climb, but for cruising the pitch is increased to 39° by appropriate operation of the pilot's manual control and thus adjustment of the spool and sleeve-type valve assembly which exhausts liquid by an appropriate amount from the chamber 31.

If, during flight, a failure in the hydraulic liquid supplied to the propeller occurs, the gas volume in the chamber 32 and the flyweights 34 instantly urge the blades fully to their feathered position.

However, assuming no such failure has occurred, and the aircraft is now coming in to alight, the pilot operates his control to increase the volume in the chamber 31 to move the blades into finer pitch. Under these conditions the new pitch is of the order of 18°. This pitch is maintained until touchdown of the aircraft, whereupon the pilot's control member is moved to a position which requires reverse pitch. Thus, maximum displacement of the member 28 and the diaphragms 29 and 30 in the fine direction is caused to occur, so that the blades move very rapidly through 0° and into the negative pitch range to −16°. The usual throttle operation, as is conventional when moving through into reverse pitch, is of course effected.

When the aircraft comes to a standstill, the pilot's control is readjusted so that the blades move back through 0° into the positive pitch range to a value of 10°, whereupon the aircraft is taxied to dispersal.

The engine throttle is now moved back to idling and the routine required of the pilot is to effect movement of the blades to 0° pitch, whereupon the drilled hole 56 in the plate 55 comes into alignment with the plunger 50. As the rotational speed of the propeller falls below 600 r.p.m., the centrifugal force on the plunger 50 is no longer able to hold the plunger radially outwardly against the effort of the coil spring 54, and thus the plunger engages the hole 56. The blades are thus now held mechanically at 0° as the propeller runs down to its stopped condition. The blades are maintained at this 0° position in readiness for the next startup so as then again to impose the least aerodynamic drag during the starting cycle of the engine.

The invention is not limited to the precise blade angles stated in the description of the above embodiments, or to 600 r.p.m. as the said predetermined rotational speed, nor is the invention limited to propellers of the reversible-pitch-type, as it is with advantage also applicable to propellers of the nonreversible pitch type.

Further, the invention is not limited to aircraft propellers, as in other embodiments it is with advantage applied to propellers for other craft.

Again, the invention is not limited to propellers having pitch-change motors which include rolling diaphragms, as in other embodiments the diaphragm assembly may comprise a rigid member surrounded by a ring of flexible material, for example rubber, bonded thereto, and also bonded to the inner surface of the pitch-change motor casing. Alternatively, instead of having a double diaphragm assembly as shown in FIG. 1, only one diaphragm may be used in the assembly, or again more than two, depending upon specific requirements and desired operating characteristics. Further, the diaphragms need not be of rubber/fabric material, as in other embodiments they may be of other nonmetallic material, or again of convoluted metallic form.

Further, the pitch-change motor casing need not be cylindrical, but be of other desired shape, while the closure member for the gas volume, and/or the rigid member in the cylinder, may be of shapes different from those shown in FIG. 1, again in dependence upon specific requirements and required operating characteristics.

Also, the invention is in no way limited to having the speed-sensitive blade pitch-holding means associated with each of the blades of the propeller, as required in the embodiment of FIGS. 1 and 2, as in other embodiments the construction may be such as to necessitate the provision of only one such blade pitch-holding means effective for holding all the blades of the propeller, provided the blades are interconnected for pitch-change.

In other embodiments instead of an indent being provided as part of the speed-sensitive blade pitch-holding means, a projecting stop may be provided in suitable manner with which the plunger, or the like, of the means can come into contact for holding the blades.

Again, although in the first-described embodiment the tube 33 is connected to the tube 44 by a union assembly 43, in other embodiments a quick-disconnect coupling of conventional form may be used to facilitate rapid removal of the propeller from the engine.

The invention is not limited to manually initiated hydraulic pitch-change operation with followup, as in other embodiments speed-sensitive governor control may alternatively be used, the governor having a manually adjustable datum-setting device. Again, alternatively, a combination of manually initiated hydraulically operable control with followup, and governor control, may be used.

We claim:

1. A bladed rotor including a hub, blades so carried upon the hub as to be variable in pitch about longitudinal blade axes, blade pitch-varying means connected to the blades, at least one of the blades carrying a plunger with an axis parallel with the pitch-change axis of the blade, a flyweight carried by the blade at such position as during operation of the rotor to oppose the centrifugal twisting moment inherent in the blades and thereby bias the blades in the pitch-coarsening direction and stop-defining means provided upon structure, adjacent to the root portion of said blade, with respect to which said blade is movable, said stop-defining means being engageable by said plunger thereby to hold the blade or blades at a required predetermined low pitch angle upon slowing down of the rotor towards its stopped condition, and said plunger, upon subsequent starting of the rotor and increase in rotational speed above a predetermined value, being released by centrifugal force from said stop-defining means to allow the blade pitch to be increased by said blade pitch-varying means, said plunger being positioned on the opposite side of said pitch-change axis from said flyweight, said blade having a root having a pair of outwardly extending axially spaced flanges thereon, said hub having a blade socket that surrounds said root and is disposed between said flanges, one of said flanges carrying said flyweight and said plunger, and bearing means disposed between said socket and the other of said flanges.

2. A bladed rotor as claimed in claim 1, wherein said plunger is axially slidably mounted in a sleeve screw-threadedly retained in an apertured portion of said one of said flanges.

3. A variable-pitch bladed rotor as claimed in claim 2, wherein said sleeve has a cap member which is readily removable therefrom for access to said plunger, said cap member retaining spring means which act upon the plunger in opposition to centrifugal force.

* * * * *